(12) United States Patent
Van Orsdol

(10) Patent No.: US 8,915,145 B1
(45) Date of Patent: Dec. 23, 2014

(54) MULTIPHASE MASS FLOW METERING SYSTEM AND METHOD USING DENSITY AND VOLUMETRIC FLOW RATE DETERMINATION

(71) Applicant: Fred G. Van Orsdol, Owasso, OK (US)

(72) Inventor: Fred G. Van Orsdol, Owasso, OK (US)

( * ) Notice: Subject to any disclaimer, the term of this patent is extended or adjusted under 35 U.S.C. 154(b) by 18 days.

(21) Appl. No.: 13/954,548

(22) Filed: Jul. 30, 2013

(51) Int. Cl.
*G01F 1/86* (2006.01)

(52) U.S. Cl.
CPC .................................. *G01F 1/86* (2013.01)
USPC ....................................... 73/861.04

(58) Field of Classification Search
None
See application file for complete search history.

(56) References Cited

U.S. PATENT DOCUMENTS

| | | | |
|---|---|---|---|
| 1,905,558 A | 4/1933 | Foote | |
| 2,039,997 A | 5/1936 | Hind | |
| 2,613,530 A | 10/1952 | Nichols | |
| 2,669,118 A | 2/1954 | Nichols | |
| 3,143,887 A | 8/1964 | Hathorn et al. | |
| 3,320,791 A | 5/1967 | Banks | |
| 3,503,267 A | 3/1970 | Shiba et al. | |
| 3,720,089 A | 3/1973 | Davis et al. | |
| 3,772,915 A * | 11/1973 | Stamler | 73/861.03 |
| 4,056,002 A | 11/1977 | Arieh et al. | |
| 4,285,239 A * | 8/1981 | Heine et al. | 73/434 |
| 4,481,805 A | 11/1984 | Dobesh | |
| 4,569,232 A * | 2/1986 | Kim | 73/861.04 |
| 4,606,218 A | 8/1986 | Chisman, III | |
| 4,745,807 A | 5/1988 | O'Neill | |
| 4,856,347 A | 8/1989 | Johnson | |
| 4,947,675 A | 8/1990 | Webb | |
| 5,392,632 A | 2/1995 | Umeda et al. | |
| 5,394,339 A | 2/1995 | Jones | |
| 6,543,281 B2 * | 4/2003 | Pelletier et al. | 73/152.47 |
| 6,581,451 B2 | 6/2003 | Ence et al. | |
| 7,290,447 B1 | 11/2007 | Burnette et al. | |
| 2007/0150547 A1 * | 6/2007 | Cook et al. | 709/212 |
| 2009/0293582 A1 | 12/2009 | Rudroff | |

* cited by examiner

*Primary Examiner* — Harshad R Patel
(74) *Attorney, Agent, or Firm* — GableGotwals

(57) ABSTRACT

A system and method for calculating the mass flow rate of a fluid stream are presented. The system includes an inlet pipe that receives the fluid stream, a density determination end, a volumetric flow rate determination end, and an outlet pipe. The density determination end may have pipe sections that are connected to each other, a weighing system to determine the apparent mass of the fluid stream, and inlet and outlet supports. The volumetric flow rate determination end of the system may be a piping system, displacer, displacer position sensors and a piping support system designed to determine the average flowing velocity of the fluid stream. The resulting density and volumetric flow rate measurements are multiplied to determine the mass flow rate of the fluid stream. The system and method are applicable to both single- and multi-phase streams and can be used in onshore and offshore applications.

17 Claims, 1 Drawing Sheet

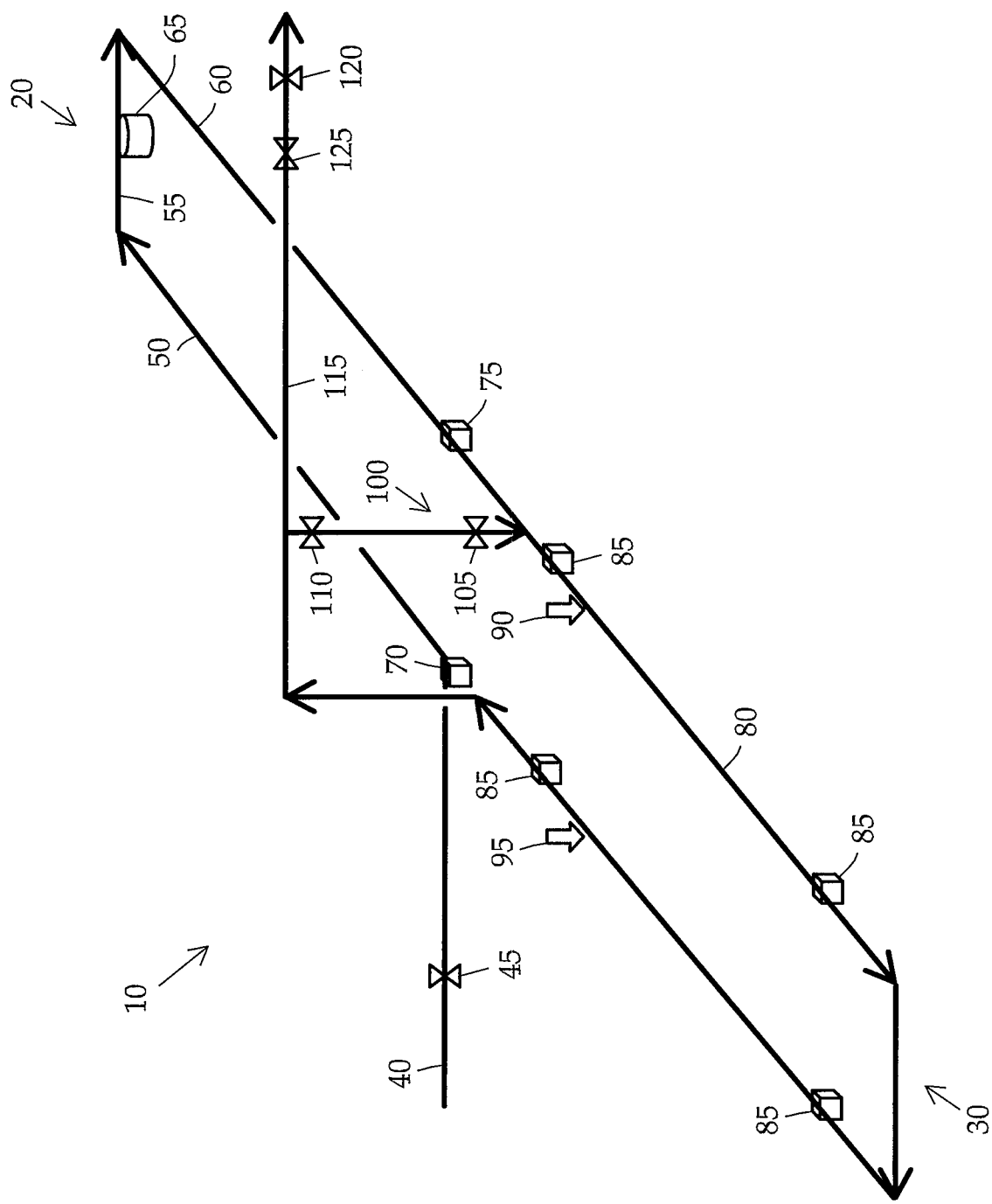

MULTIPHASE MASS FLOW METERING SYSTEM AND METHOD USING DENSITY AND VOLUMETRIC FLOW RATE DETERMINATION

1. FIELD OF THE INVENTION

The present invention relates to a system and method for determining the mass flow rate of a fluid stream flowing through a piping system. The system and method may be used for single- or multi-phase fluid streams in oil and gas producing locations, and is particularly applicable in deep subsea applications.

2. BACKGROUND OF THE INVENTION

Within the oil and gas industry, it is frequently necessary to determine the mass flow rate of a single- or multi-phase fluid stream flowing through a pipeline. For example, in a multi-phase produced stream containing water, natural gas, and liquid hydrocarbons, the mass flow rate may be used to determine the final volumes and the resulting value of each product stream.

Separate gas and liquid flow meters are traditionally used to determine the total mass, energy and/or volumetric flow rate of multi-phase fluid streams. However, multiple meters, production separators and other related equipment are typically required to divide the products into single phase streams prior to measurement since conventional meters in the oil and gas industry cannot accurately determine the mass flow rate of multi-phase fluid streams. Systems of this type, particularly offshore and in deep water applications, require huge expenditures to provide this capability on-board offshore platforms of various types. There are newer technologies being used to determine the mass flow rates of produced multiphase streams offshore (microwave, gamma radiation, etc.), but they have an unacceptably high measurement uncertainty unless the stream being measured is close to being all gas or all liquid. These systems are being used in order to avoid the capital costs associated with offshore platforms even though their measurement performance is very poor. Due to the large volumes involved and the relatively high values of oil and natural gas, even small inaccuracies introduced by the flow meter can lead to significant losses within a relatively short period of time.

Therefore, there is a need in the industry for systems and methods that will accurately determine the mass flow rate of multi-phase fluid streams without first requiring that the fluid stream be divided into separate streams (natural gas, liquid hydrocarbon and water). There is also a need for a single system that can collect all of the measurements needed to calculate the mass flow rate, thereby improving efficiency, reducing capital costs, eliminating the need for an associated production platform and minimizing the amount of space needed for the system. Note that for existing or new systems using high uncertainty measurement systems, the invention could be used to correct the mass flow rate indications from those systems to values much closer to actual, greatly reducing the uncertainties associated with these various technologies.

3. BRIEF DESCRIPTION OF THE INVENTION

A system for calculating the mass flow rate of a fluid stream is presented. The system includes an inlet pipe that receives the fluid stream, a density determination end, a volumetric flow rate determination end, and an outlet pipe. The diameter of the piping in the system can be varied to effectively determine the flowing velocity of the fluids in the stream being measured. Increasing the diameter will reduce velocities, while reducing the diameter will increase the velocities.

The density determination end may have a plurality of pipe sections that are connected to each other, a weighing system, an inlet support, and an outlet support. The intent is to have two relatively long pipe segments with the supports on one end and a 180 degree pipe bend or short piping section at the other end supported by the scale mechanism. By weighing one end of the density determination system on a scale, by zeroing the scale indication when the system is empty or by mathematically removing the effects of the weight of the steel in the piping system support at one end by the scale, and by considering the total internal volume of the density determining system between the supports and the end supported by the scale, the density of the flowing stream may be determined. This determination may be continuous or intermittent at selected intervals, depending on the configuration of the system.

The piping in the volumetric flow rate determination end includes displacer position sensors and a displacer system that introduces a displacer (ball/sphere) into the flowing stream upstream of the first position sensor. The flowing stream will cause the displacer to move through the precisely known volume in the pipe between the sensors at the same average velocity as the multi-phase fluid stream. By knowing the internal volume of this section and the time it takes the displacer to transit this section between the position sensors, the average flowing velocity of the multiphase stream can be calculated. After the displacer has passed through the measuring section between the position sensors, it will be diverted and recovered into the launch and recovery system in preparation for the next run. The frequency of runs will be determined on a case by case basis, depending primarily on how stable the flow rates through the system tend to be.

A method for calculating the mass flow rate of a fluid stream is also presented. The method includes the steps of feeding a fluid stream through the system, using measurements from the density determination end of the system to calculate the average flowing density of the fluid stream, using measurements from the volumetric flow rate determination end of the system to calculate the average volumetric flow rate of the fluid stream, and multiplying the density by the volumetric flow rate to determine the mass flow rate of the fluid stream. The average fluid density may be determined by direct calculation or by comparison of the systems response to fluids with known density. The volumetric flow rate may be determined by knowing the time required for a displacer moving through the piping system with a precisely known internal volume between the displacer detector switches. There are other technologies, such as ultrasonic meters using Doppler shift technology that may also be able to provide the average flowing velocity of the multiphase stream, but they are not considered in this application.

4. BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawing (which is not to scale). The FIGURE is a schematic perspective view of an embodiment of the present invention.

5. DETAILED DESCRIPTION

Turning now to the drawing, an embodiment of the system of the present invention is illustrated. The system combines a density determination end and a volumetric flow rate determination end. The resulting density and volumetric flow rate measurements can be used to calculate the mass flow rate of a single- or multi-phase fluid stream. The system is useful in onshore and offshore applications and in both high and low pressure environments. As an example, the system may be used in deep subsea oil and gas producing locations to accurately determine the mass flow rate of fluid streams containing a mixture of water, natural gas, and hydrocarbon liquids.

The fluid stream to be measured is delivered to the system 10 through an inlet block valve 45 and pipe 40. The fluid stream from the inlet pipe 40 flows through the density determination end 20 of the system 10. Next, the fluid stream flows through the volumetric flow rate determination end 30 of the system 10. The fluid stream then exits the system 10 through an outlet pipe 115 and an outlet block valve 120. The outlet system may include an optional backpressure control valve 125 to maintain a constant pressure in the system and/or control the flow rate through the system. Also, while the description of the system and method show the density being determined first and the volumetric flow rate being determined second, the order of these steps may be carried out in reverse order.

The density determination end 20, which includes three pipe sections 50, 55 (which may consist of only a 180 degree bend in the piping), 60, a weighing system 65, an inlet support 70, and an outlet support 75, measures the response of the system 20 to the weight of the fluid stream passing through the density determination end 20. By knowing the weight of the fluids in the density determination end, by eliminating the effect of the weight of the piping on the system (mathematically or by zeroing the scales with the system empty) and by knowing the internal volume of the density determination end, the average density of the fluids in the section can be calculated. As described below, the average density can then be determined by weighing and calculation or by comparing the weight response of the system 20 to its response to other well-known fluid streams of known density. Both methods are equally applicable to single- and multi-phase fluid streams.

The density determination end 20 of the system 10 has a first pipe section 50 that receives the fluid stream from the inlet pipe 40, a second pipe section or 180 degree pipe fitting 55 that receives the fluid stream from the first pipe section 50, and a third pipe section 60 that receives the fluid from the second pipe section 55 and transmits it to the volumetric flow rate determination end 30 of the system 10. As shown in the FIGURE, the pipe sections may preferably be arranged in a U-shape, with the first and third pipe sections 50, 60 being longer than the second pipe section 55 which may consist of only a 180 degree pipe fitting or a very short section of straight pipe connected to sections 50 and 60 by 90 degree pipe fittings. System performance will improve as the length of sections 50 and 60 increase, but care must be taken to ensure their length does not exceed the recommended clear span length for unsupported pipe in similar oil and gas applications. All piping must be capable of withstanding internal pressure from the contained fluid stream as well as external pressure from the surrounding environment over the full range of operating conditions. The diameter of the piping sections may be varied to adjust flow rates through the system.

The weighing system 65 at the density determination end 20 may be a strain gauge, load cell-type system, or other type of scale known in the art. The weighing system 65 may also include a recorder (not shown) which takes periodic or continuous measurements and transmits the measurements to a computer or other device for processing. In addition to determining the weight effects of the fluid stream on one end of the density determination system 20, the weighing system 65 also acts as a support for one end of the pipe sections in the density determination system 20. When the system is used in a subsea environment, piping in the mass determination system 10 may float if it is empty or if it contains only air or low pressure vapors. To prevent this buoyancy, the system can be designed to maintain at least some weight on the weighing system and support points at all times. Alternatively, methods and instruments that are known in the art can be used to design a weighing system that can accommodate buoyancy.

In addition to the support provided by the weighing system 65, an inlet support 70 is located at or near the inlet of the first pipe section 50 and an outlet support 75 is located at or near the outlet of the third pipe section 60. The inlet and outlet supports 70, 75 and the support provided by the scale 65 at the opposite end of the density determining system 20 ensure that acceptable piping stresses are not exceeded and that the density determination end 20 is able to move in response to thermal and dynamic stresses. The inlet and outlet supports 70, 75 must also be located at a sufficient distance from the second pipe section 55 and the weighing system 65 so that the scales 65 can accurately reflect the apparent mass changes inside the pipe. As an alternative, rather than the long pipe sections 50, 60 being supported at the inlet and outlet ends by fixed support points only 70, 75, flexible or articulating connections may be used near the support points 70,75 to allow the weighing section to freely transmit the weight of the pipe and fluid to the weighing system 65. Note that the scale 65 should support essentially one-half the total weight of the density determination system 20 since it supports one end of the system. Some additional calculations may be required to adjust the scale indication for various piping configurations that could be used in the density determining system 20, but the design should ensure that approximately one-half the weight of the density determining system 20 be supported by the scale 65.

The density (D) of the fluid stream at flowing conditions can be calculated by dividing the weight or apparent mass (M) of the fluid stream passing through the density determination end 20 (as indicated by the scale) by the volume ($V_d$) of the density determination end 20 ($D=M/V_d$).

The volume of the density determination end 20 may be determined through calculation, volumetric, or gravimetric means. As an example, the volume may be calculated using the known lengths and cross-sectional areas of the pipe sections 50, 55, 60. In order to improve accuracy, the volume may be adjusted for the effects of temperature and pressure on the pipe sections. For example, if the pipe sections are made of steel, a thermal expansion coefficient can be applied to account for the volume change due to temperature deviations from the test conditions when the original volume was determined. Similar adjustments may be made for pressure using pressure-related coefficients.

In an example, the volume of the density determination end 20 is calculated to be 10 barrels. The weighing system provides an apparent total mass of 1,000 pounds on the supporting structures 70, 75 and scale 65 when there is no fluid flowing through the density determination end 20. The scale indication would be approximately 500 pounds, or it could be set to zero so only additional weight from the flowing stream would be indicated by the scale. In the example, with fluid passing through the system, the total apparent mass of the density determination end is 3,000 pounds (the scale indication times 2). The scale would indicate 1500 pounds in this example, if it was calibrated to show all the weight it supported. It would indicate 1000 pounds if calibrated to show only the weight increase due to the fluid in the pipe. As a result, the apparent mass of the fluid stream is 2,000 pounds. Dividing this apparent mass by the internal volume of the system results in an average fluid density of 200 pounds per barrel under actual operating conditions (2000 pounds divided by 10 barrels).

Alternatively, the average density of a fluid stream may be determined by comparison to fluids of known density. In this process, the system is first weighed with no fluid flowing through the density determination end 20 to allow the user to understand and eliminate the effects of the weight of the piping in the system. The system is then calibrated to density changes using a fluid or series of fluids with well-known physical properties, including density. As an example, the system may be calibrated with fresh water, high-pressure natural gas, sea water, fresh water and/or one or more crude oils or products with known relative densities. The weight exerted by each known fluid is then plotted against its actual or relative density, and the individual points on the graph are connected by a performance curve. A single- or multi-phase fluid with unknown density is then passed through the density determination end of the system 20, where it is weighed by the weighing system. The resulting measurement of mass can then be referenced to the performance curve to determine the corresponding density of the fluid.

After flowing through the density determination end 20 of the system 10, the fluid stream then flows through the volumetric flow rate determination end 30. This end of the system 10 determines the average flowing velocity of the fluid stream by determining the time it takes a displacer to move through the well-known volume between the position sensors 90, 95 in the volumetric flow rate determination end 30. As described in the following paragraphs and illustrated in the FIGURE, the volumetric flow rate determination end 30 may be primarily comprised of a ball (displacer) launching and recovery system 100, position sensors 90, 95 and a piping section of known internal volume 80 between the position sensors 90, 95. However, any method that can measure the average flowing velocity and volumetric flow rate of a discrete amount of fluid at operating conditions may be used. Such methods may include, but are not limited to, small volume provers, ultrasonic systems, and Doppler shift systems.

The volumetric flow rate determination end 30 may be comprised of multiple pipe sections 80 organized as two substantially parallel legs joined at one end by a shorter leg to form a U-shape. Multiple supports 85 are placed under the pipe sections 80 so that the volumetric flow rate determination end 30 of the system 10 is substantially level and well supported. The volumetric flow rate determination end 30 also includes a displacer (not shown), which can be a ball, sphere, piston, or other configuration known in the art. As an example, each ball may be a hollow sphere of rubber, polyethylene or other material filled with a liquid so that its average density is greater than that of the fluid stream being measured. Regardless of its shape, the displacer must seal against the interior wall of the pipe sections 80 so that it moves at the same velocity as the fluid pushing it through the volumetric flow rate determination end 30. The volumetric flow rate determination end 30 also includes a first position sensor 90 near the inlet to the volumetric flow rate determination end 30 and a second position sensor 95 located downstream from the first position sensor 90. As shown in the FIGURE, the first and second position sensors 90, 95 may be located directly across from each other on opposing parallel pipe sections, but other configurations would work as well.

The first and second position sensors 90, 95 are activated by the displacer, and may be any configuration that is known in the art.

A displacer return conduit 100 with a first valve 105 and a second valve 110 is located downstream from the second position sensor 95 and before the outlet pipe 115. Opening the first valve 105 releases the displacer, which has been positioned between the valves of the launch and recovery system, into the fluid stream at a location upstream of the first position sensor 90. Opening the second valve 110 separates the displacer from the fluid stream after it has passed by the second position sensor 95, allowing the fluid stream to flow to the outlet pipe 115 and the displacer to enter the return conduit 100 where it can be re-used. The opening to the return conduit 100 above the second valve 110 may be screened or otherwise partially blocked to facilitate the separation of the fluid stream and the displacer.

As the fluid stream flows into the volumetric flow rate determination end 30, the first valve 105 is opened and the displacer is released into the fluid stream. After releasing the displacer, the valve 105 closes. As the displacer is carried along by the flow of the fluid stream, it contacts the first position sensor 90, which starts a timer, counter, or other interval measuring device. The fluid stream and displacer continue to move through the pipe sections 80 of the ball counter. The displacer then contacts the second position sensor 95, which stops the interval measuring device/timer. The fluid stream then flows past the return conduit 110, where the displacer is separated from the fluid and to the outlet pipe 115 where it exits the system 10. Aided by gravity and elevation, the displacer moves into the return conduit 100 where it is positioned for subsequent reuse. Valve 110 opens long enough to allow the displacer to drop into the space between valves 105 and 110, then valve 110 closes. At this point, the system is ready to repeat another flow rate measurement cycle. Information from the first and second position sensors 90, 95 is fed to a recorder or other device (not shown).

The volumetric flow rate determination end 30 measures the amount of time (t) it takes for the displacer to travel from the first position sensor 90 to the second position sensor 95. Because the displacer has the same average velocity as the fluid, the time measurement also applies to the fluid stream. Based on the known cross-sectional area and length of the pipe sections 80 in the volumetric flow rate determination end 30, the volume ($V_f$) of the fluid stream between the position sensors can be readily calculated. The average flowing velocity of the fluid stream can then be determined by dividing this volume by time ($V_f/t$) and applying standard conversion factors, as needed, to adjust the units. As an example, if the volume of the pipe section between the position sensors is 10 barrels and the time for the displacer to travel from the first position sensor to the second position sensor is 5 seconds, the resulting volumetric flow rate is 2 barrels per second or 120 barrels per minute.

The displacer may be launched as often as desired by the user. Factors that should be considered when determining the frequency of repetition include, but are not limited to, how often the displacer must be replaced, the potential for wear on the interior wall of the pipe sections, and the characteristics of the fluid stream.

The mass flow rate through the system at any single point in time may be calculated, with low uncertainty, by multiplying the density from the density determination end and the volumetric flow rate from the volumetric flow rate determination end. As an example and as previously calculated, if the average density of the fluid stream is 200 pounds per barrel and the volumetric flow rate is 120 barrels per minute, the mass flow rate is 24,000 pounds per minute. Alternatively, continuous density and periodic volumetric flow rate measurements may be used to determine the mass flow rate through the system over any desired period of time. The system and method of the present invention are applicable to both single- and multi-phase fluid streams. In addition, once the total mass flow rate of a multi-phase fluid is known, the approximate amount of material in each phase can be estimated. For example, knowing the total mass flow rate of a produced stream aids in the determination of the relative amounts of water, natural gas, and hydrocarbon liquids in the stream and its resulting value. Capacitance probes may be used to help determine the water content of the stream. Comparing the mass flow rate of the multi-phase stream to the apparent mass of the stream if it were all liquid phase can give a good indication of the volume of the fluid in the gas phase of the stream relative to the volume of the stream in the liquid phase.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A system for calculating the mass flow rate of a multiphase fluid stream, the system comprising:
    an inlet pipe that receives the multiphase fluid stream, the multiphase fluid stream having a weight;
    a density determination end that receives the multiphase fluid stream from the inlet pipe, the density determination end comprising a plurality of pipe sections, a weighing system, an inlet support, and an outlet support, the pipe sections and the multiphase fluid stream having a total weight;
    a volumetric flow rate determination end that receives the multiphase fluid stream from the density determination end;
    an outlet pipe that receives the multiphase fluid stream from the volumetric flow rate determination end; and
    a means for calculating an average mass flow rate of all phases of the multiphase fluid stream based on information from the density determination end and the volumetric flow rate determination end.

2. The system according to claim 1, wherein the weighing system is chosen from the group consisting of a strain gauge, load cell, or scale.

3. The system according to claim 1, wherein the weighing system further comprises a recorder which takes periodic or continuous measurements.

4. The system according to claim 1, wherein the weighing system is also a support for the density determination end.

5. The system according to claim 1, wherein the inlet and outlet supports are positioned so that approximately a first one-half of the total weight of the pipe sections and the multiphase fluid stream in the density determination end is supported by the supports, with a second one-half of the total weight supported by the scales on an opposite end of the density determination end, the supports and scale continuously supporting the density determination end and the piping system is capable to respond to changes in temperature, pressure and the dynamics of the multiphase fluid stream.

6. The system according to claim 1, the volumetric flow rate determination end, further comprising a plurality of pipe sections resting on a sufficient number of supports to maintain the volumetric flow rate determination end in a level and safe condition while still allowing the system to move slightly in response to temperature and pressure changes and the dynamics of a flowing stream in a closed steel pipe conduit; and a displacer that moves through the pipe sections, with a first position sensor located near an inlet of the volumetric flow rate determination end, a second position sensor located downstream from the first position sensor, and a displacer launch and recovery system located between the second position sensor and the outlet pipe.

7. The system according to claim 6, wherein the displacer is chosen from the group consisting of balls, spheres, or pistons.

8. The system according to claim 6, wherein the first and second position sensors are activated by passage of the displacer.

9. The displacer launch and recovery system according to claim 6 further comprising: a first valve openable to release the displacer into the multiphase fluid stream at a location upstream of the first position sensor.

10. The system according to claim 6 further comprising a return conduit having a second valve, wherein the second valve opens to separate the displacer from the multiphase fluid stream.

11. A method for calculating the mass flow rate of a multiphase fluid stream, the method comprising the steps of:
    feeding the multiphase fluid stream through a density determination end and a volumetric flow rate determination end of a system;
    using measurements from the density determination end of the system to calculate average density of the multiphase fluid stream;
    using measurements from the volumetric flow rate determination end of the system to calculate the average volumetric flow rate of the multiphase fluid stream;
    multiplying the average density of the multiphase fluid stream and the average volumetric flow rate of the multiphase fluid stream to calculate the average mass flow rate;
    weighing a plurality of fluids of known densities in the density determination end to compare the response of the system to an unknown fluid relative to its response to these fluids with known densities and approximate the density of the unknown fluid;
    plotting the system response and density of each fluid of known density on a graph;
    weighing the unknown fluid stream as it passes through the density determination end to determine its apparent mass/scale weight response; and
    using the graph to compare the density of the unknown fluid stream to the density of the fluids with known density.

12. The method according to claim 11, the method further comprising the steps of:
    determining the weight of the multiphase fluid stream passing through the density determination end to determine the apparent mass of that portion of the multiphase fluid stream; and
    determining the volume of the density determination end to allow the apparent mass in the density determination end to be divided by an internal volume of the density determination end to calculate a density of the fluid passing through the density determination end.

13. The method according to claim 11, wherein the volumetric flow rate determination end is a system for determining the time required for a displacer to move through a piping and displacer position detector system with a known internal volume.

14. The method according to claim 13, the method further comprising the steps of:
releasing a displacer into the multiphase fluid stream, wherein the displacer and the multiphase fluid stream have equal velocities;
starting a timer when the displacer contacts a first position sensor;
stopping the timer when the displacer contacts a second position sensor, which is located downstream of the first position sensor;
calculating the time required for the displacer to travel from the first position sensor to the second position sensor; and
determining the volume of the volumetric flow rate determination end between the position sensors
dividing the volume displaced as the displacer moves from one position sensor to the next by a time required for the displacer to move from the first to the second position sensor to calculate the average flowing velocity of the multiphase fluid stream.

15. The method according to claim 14, the method further comprising the step of:
releasing the displacer into the multiphase fluid stream through a first valve in a launch and recovery system and upstream of the first position sensor.

16. The method according to claim 14, the method further comprising the step of:
separating the displacer and the multiphase fluid stream through a second valve in the launch and recovery system downstream of the second position sensor;
channeling the multiphase fluid stream to an outlet pipe; and
positioning the displacer in a return conduit.

17. The method according to claim 14, wherein the steps of the method are repeated to determine volumetric flow rate through the system periodically over time.

* * * * *